United States Patent [19]

Koen et al.

[11] Patent Number: 5,444,769

[45] Date of Patent: Aug. 22, 1995

[54] DATA COMMUNICATIONS SYSTEM FOR ESTABLISHING LINKS BETWEEN SUBSCRIBER STATIONS AND BROADCAST STATIONS

[75] Inventors: Jacobus P. L. Koen, Johannesburg; Richard Clark, Sandton, both of South Africa

[73] Assignee: David Wallace Zietsman, Transvaal, South Africa

[21] Appl. No.: 292,321

[22] Filed: Aug. 16, 1994

Related U.S. Application Data

[63] Continuation of Ser. No. 992,635, Dec. 18, 1992, abandoned.

[30] Foreign Application Priority Data

Dec. 20, 1991 [ZA] South Africa ............... 91/10059

[51] Int. Cl.⁶ ............................................. H04M 11/00
[52] U.S. Cl. ....................................... 379/94; 379/92; 379/96; 348/13
[58] Field of Search .................. 379/94, 92, 96, 97, 379/98, 93, 90, 110, 102, 104, 105; 348/12, 13; 455/5.1, 6.3

[56] References Cited

U.S. PATENT DOCUMENTS

| | | | |
|---|---|---|---|
| 4,654,868 | 3/1987 | Shelley | 379/106 |
| 4,811,389 | 3/1989 | Balch | 379/107 |
| 5,003,581 | 3/1991 | Pittard | 379/93 |
| 5,018,736 | 5/1991 | Pearson et al. | 379/92 |
| 5,034,807 | 7/1991 | Von Kohorn | 358/86 |
| 5,120,076 | 6/1992 | Luxenberg et al. | 358/84 |

Primary Examiner—Curtis Kuntz
Assistant Examiner—Stella L. Woo
Attorney, Agent, or Firm—Rothwell, Figg, Ernst & Kurz

[57] ABSTRACT

An interactive data communications system comprises a plurality of subscriber stations each of which has an identification code associated therewith and an entry terminal for manually entering data in response to a broadcast signal. Each entry terminal is connectable to a transmission line, the system including switching means for selectively allowing either data or voice signals to be conveyed down the transmission line. The transmission lines are linked to a data switching mechanism which includes a plurality of voice/data multiplexers. A control station is arranged to communicate with the data switching mechanism via a data link, the control station comprising at least one host computer for processing the data entered from the various entry terminals. The invention extends to a method of establishing a data link between a subscriber station and a host station which utilizes an interactive data communications systems.

5 Claims, 4 Drawing Sheets

DATA COMMUNICATIONS SYSTEM FOR ESTABLISHING LINKS BETWEEN SUBSCRIBER STATIONS AND BROADCAST STATIONS

This is a continuation of application Ser. No. 07/992,635, filed Dec. 18, 1992, now abandoned.

BACKGROUND TO THE INVENTION

This invention relates to a data communications system for establishing data communication links between a plurality of subscriber stations and one or more broadcast stations.

Audience participation in most televised quiz shows is restricted to the studio audience. Any viewer participation is usually limited to the answering of one or two questions by mail.

Certain radio quiz shows have, in the past, had a phone-in system in which the first correct caller wins a prize. One of the major problems associated with such a system is that the switchboard at the broadcast station is able to handle only a fraction of the calls which are made, and most of the callers are unable to get through.

SUMMARY OF THE INVENTION

According to a first aspect of the invention there is provided an interactive data communications-system comprising a plurality of subscriber stations, each subscriber station having a characteristic identification code associated therewith and including an entry terminal for manually entering data in response to a broadcast signal, each entry terminal being connectible to a transmission line, switching means for selectively allowing data or voice signals on the transmission line via the entry terminal or via a telephone respectively, a data switching mechanism including a plurality of voice/data multiplexers linked to a plurality of input transmission lines, and a control station arranged to communicate with the data switching mechanism via a data link, the control station comprising at least one host computer for processing the data entered from the various entry terminals.

Preferably, the data switching mechanism is linked to the control station via a wide area network, the wide area network also interlinking the control station and a broadcast station.

A plurality of data concentrators may be provided at the outputs from the voice/data multiplexers within a single data switching mechanism and/or at the outputs from a plurality of data switching mechanisms.

In a preferred form of the invention, the data switching mechansim is interposed between the input transmission lines and a public switched telephone network (PSTN), the data switching mechanism being transparent in respect of voice signals-travelling to the PSTN. The data switching mechanism is preferably located in or in close proximity to a local telephone exchange.

The invention extends to a method of establishing a data communications link between a subscriber station and a host station comprising the steps of:

a) manually entering data into an entry terminal located at the subscriber station, the data being representative of a response to a broadcast signal;
b) transmitting the data via a transmission line to a data/voice multiplexer;
c) routing the data from the data/voice multiplexer via a data link to a control centre;
d) processing the data in a host computer at the control centre.

The method may include the steps of transmitting an identification signal from the entry terminal to the control centre, and verifying the identification signal at the control centre.

The invention may include the further steps of transmitting the received data back from the control centre to the relevant entry terminal, and confirming the accuracy of the data at the entry terminal.

DESCRIPTION OF EMBODIMENTS

Figure 1:
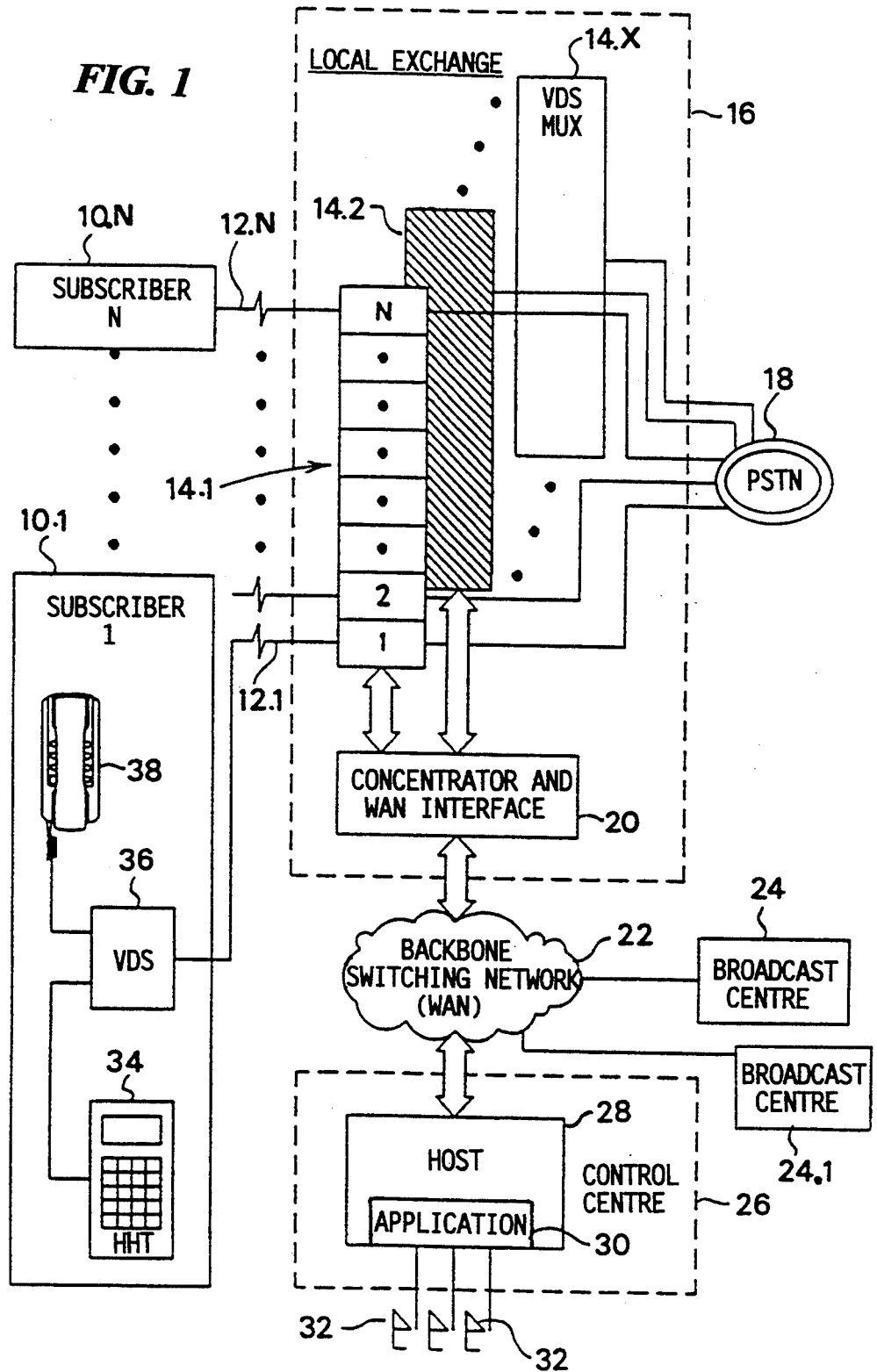
FIG. 1 shows a schematic block diagram of a data communications system of the invention.

The data communications system illustrated in FIG. 1 has as its main components a plurality of subscriber stations 10.1 to 10.N which are linked by means of twisted pairs of telephone lines 12.1 to 12.N to a multiplexer unit 14.1. Clearly fibre optic lines, radio links, or other transmission lines would be used to communicate between the subscriber stations and the multiplexer unit. The multiplexer unit 14.1 is one of a number of multiplexer units 14.1 to 14.X which form part of a local exchange 16. The local exchange 16 is interposed between the subscriber units 10.1 to 10.N and a public switched telephone network, or PSTN 18. All of the multiplexer units 14.1 to 14.X are coupled to a concentrator and a wide area network (WAN) interface 20. The concentrator and WAN interface 20 is in turn linked up to a conventional backbone switching wide area network 22. The wide area network, or WAN 22 is used to interlink both a broadcast centre 24 and a control centre 26 with a number of local exchanges similar to the local exchange illustrated at 16. The control centre 26 has one or more host computers 28 which run application software 30. The host computer 28 and the application software 30 is operable via a number of operator terminals 32. It will be understood that the system can be used with a plurality of broadcast centres as indicated by numeral 24.1. The control centre could have multiple computers controlling the data from the subscribers, and there could be a plurality of control centres.

It is important to note that the multiplexer units 14.1 to 14.X need not be located within the local exchange 16. An alternative arrangement would be for the multiplexer units to be housed in a stand alone housing which will interface with both the subscriber lines 12.1 to 12.N and the local exchange 16.

Figure 2:
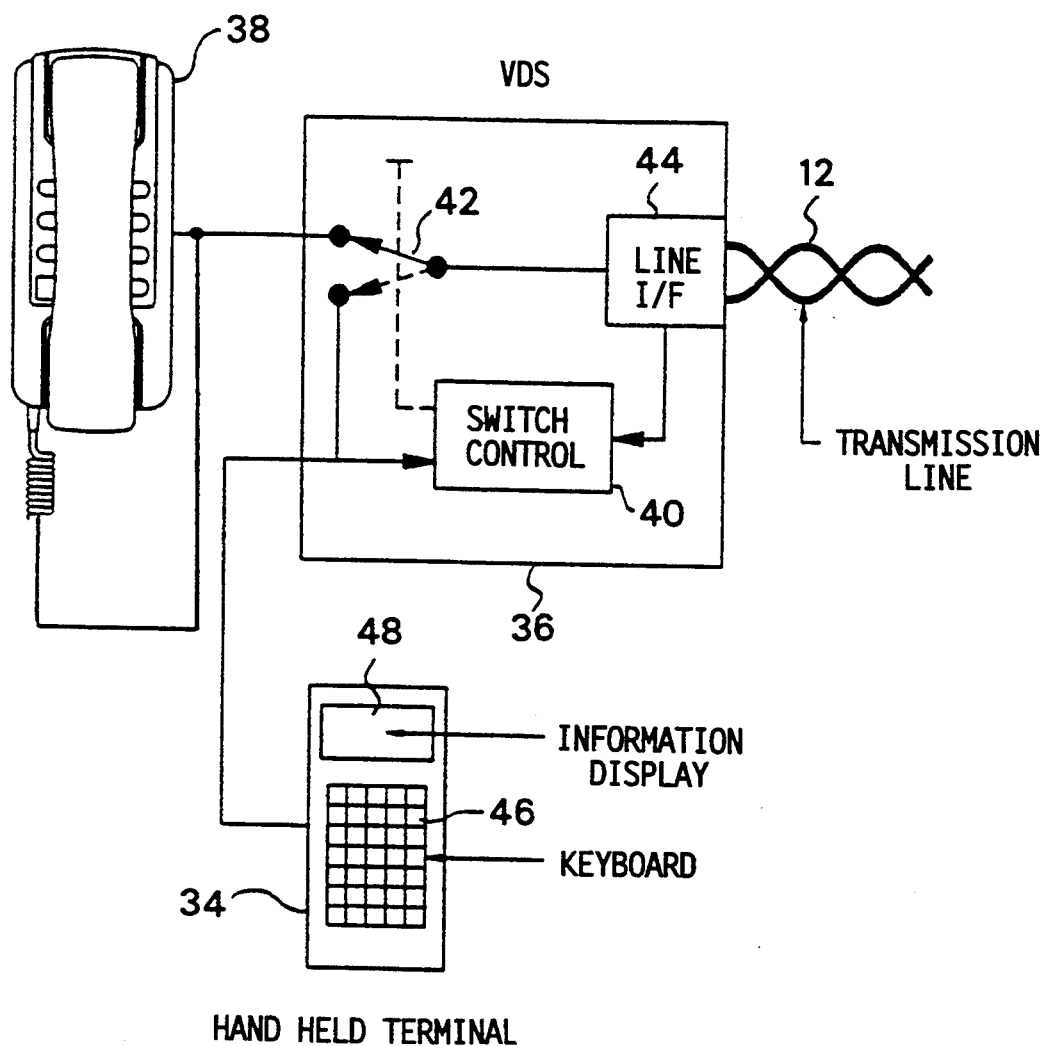
FIG. 2 shows a schematic block diagram of a subscriber station forming part of the data communications system of FIG. 1.

Referring now to FIG. 2, each subscriber station 10 comprises a hand held terminal 34 connected to a voice/data switch (VDS) 36. Also connected to the VDS 36 is a conventional telephone handset 38. Switch control circuitry 40 controls the operation of a switch 42 which is able to connect selectively either the telephone 38 or the hand held terminal 34 to the twisted pair 12 via a line interface unit 44. The hand held terminal 34 has a keyboard 46 and an information display panel 48. The keyboard 46 is used for the manual entering of numbers which are representative of answers. The information display panel 48 enables the subscriber to monitor the entry of such numerical answers and to receive verification of their correctness.

Figure 3:
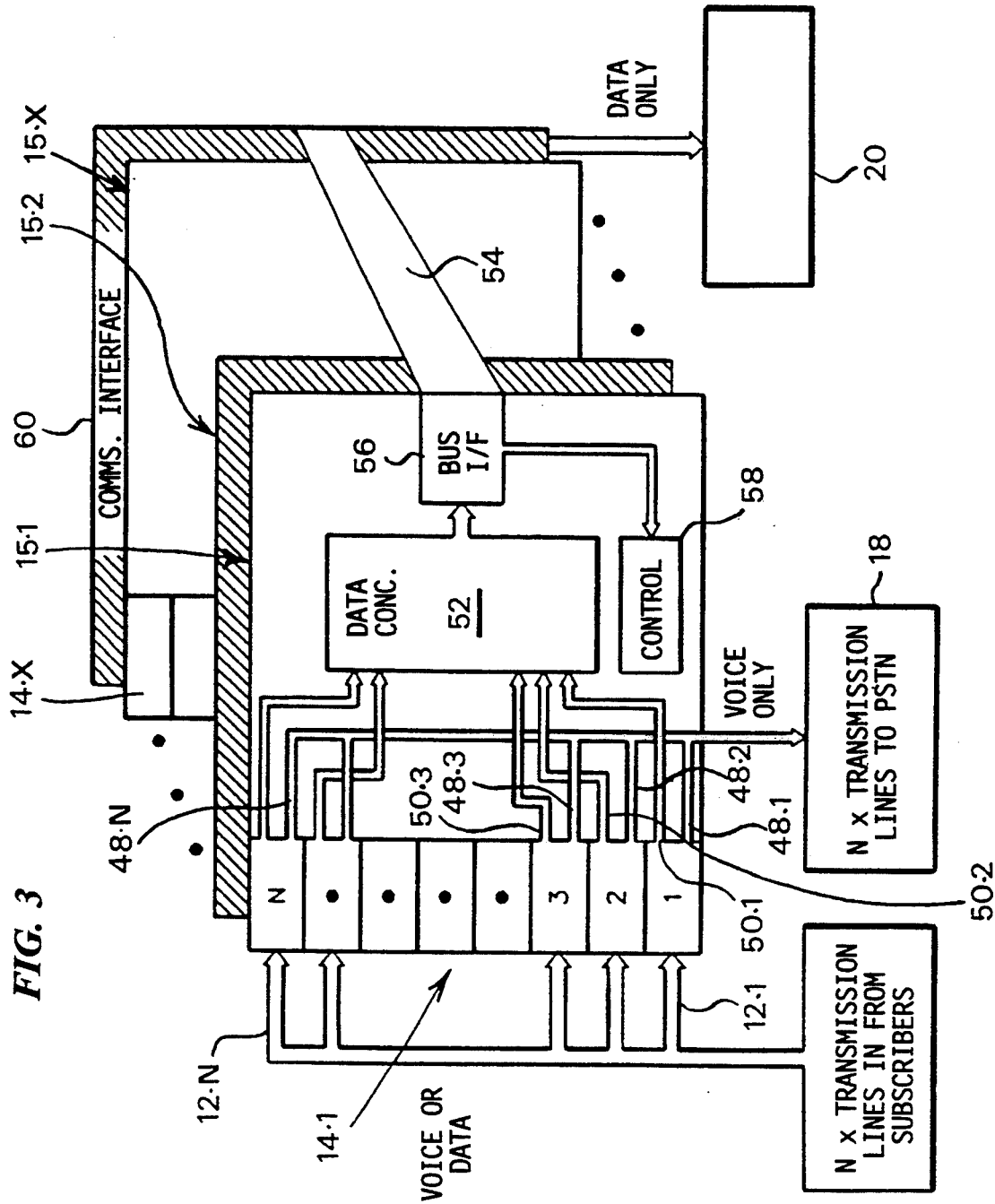
FIG. 3 shows a plurality of multiplexer units also forming part of the data communications system of FIG. 1.

Referring now to FIG. 3, the multiplexer units 14.1 to 14.X are incorporated on respective voice/data switching, or VDS multiplexer cards 15.1 to 15X mounted together in a multiplexer card cage (not shown). Each card 15.1 has a plurality of VDS switches 1 to N fed by respective twisted pairs 12.1 to 12.N, the switches 1 to N in combination forming the multiplexer unit 14.1. Each VDS switch 1 to N has a respective voice output line 48.1 to 48.N and a data output line 50.1 to 50.N, all of which are in the form of twisted pairs. The voice output lines 48.1 to 48.N are fed to the PSTN 18, and the data output lines 50.1 to 50.N are routed to a data concentrator 52. The input data from those subscribers linked to the multiplexer card 15.1 are concentrated at the data concentrator 52 and are subsequently fed to a common bus 54 via a bus interface unit 56. The bus 54 interconnects all the multiplexer cards 15.1 to 15.X within the multiplexer card cage. A control unit 58 controls the output of data via the bus interface unit 56. The common bus 54 is connected to a communications interface card (CIC) 60 which is assimilates the data from all the multiplexer cards 15.1 to 15.X in the multiplexer cage. The data is then forwarded to the concentrator and WAN interface 20.

Figure 4:
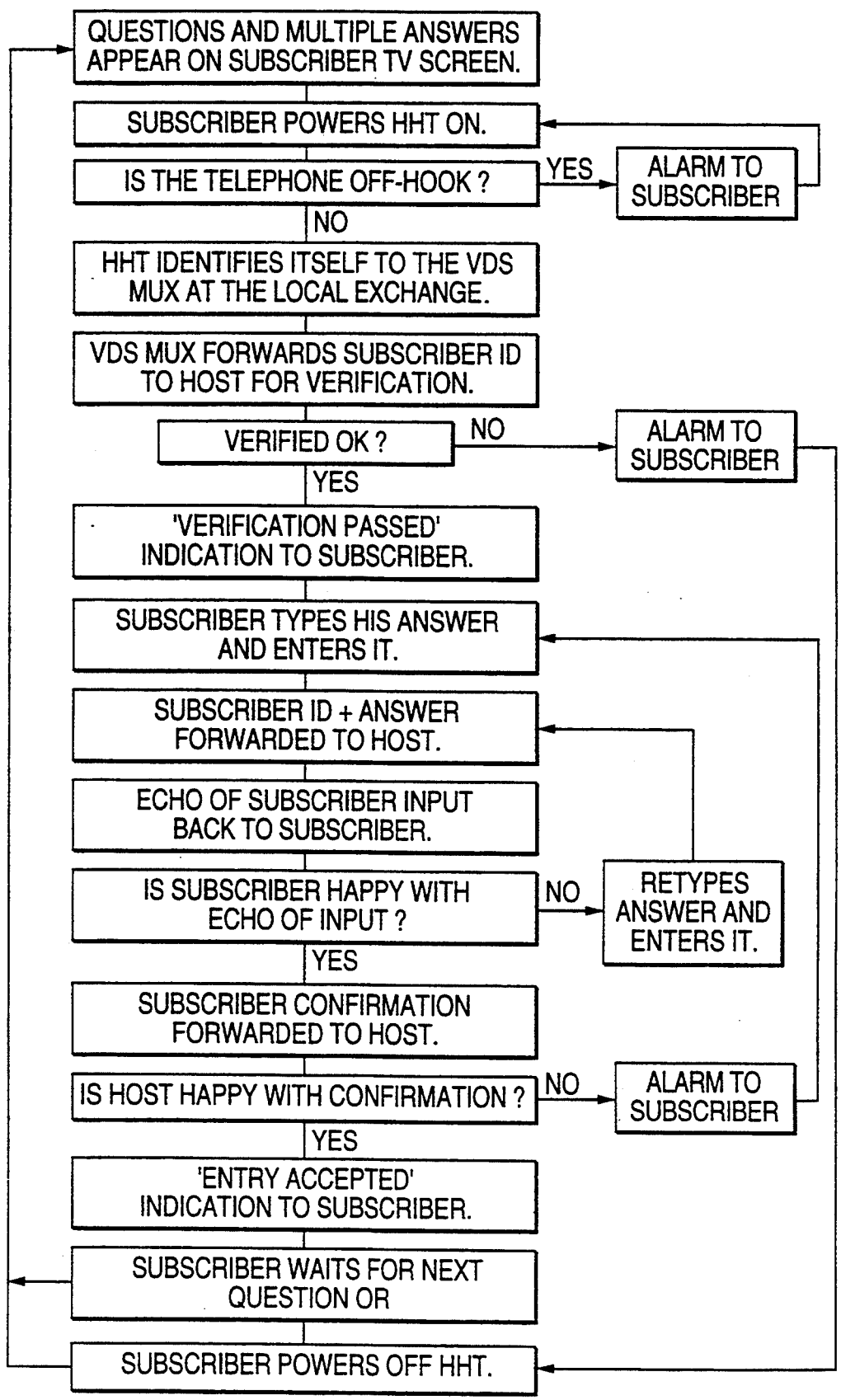
FIG. 4 shows a flow chart indicating the steps involved in a method of establishing a data communications link using the data communications system of FIG. 1.

The operation of the data communications system is set out in detail in the flow chart in FIG. 4. In brief, multiple choice-type questions appear on the TV screen of a subscriber, each possible answer having a number associated with it. The subscriber switches on his hand held terminal 34, after checking that the telephone handset is not off its cradle. The switch control unit 40 will switch the contact switch 42 to connect up the hand held terminal 34 once it has been activated. The subscriber then manually enters an identification code on the keyboard 46. This identification code is transmitted via the VDS switch 36, the telephone line 12, the multiplexer card 15.1, the concentrator and WAN interface 20 and the backbone switching network 22 to the host computer 28 where it is verified. The verification signal is passed back in the reverse direction along the same route, where it appears in readable form on the information display panel 48. The subscriber then types his answer in on the keyboard 46 and enters it. The subscriber ID and answer is transmitted back to the host computer 28 at the control centre 26. The answer is then echoed back to the subscriber, where it appears on the screen 48 for verification. If the subscriber is satisfied with the echoed signal, he transmits a confirmation signal back to the host. If not, he enters the answer once more on the keyboard 46. Once the host computer has received the confirmation signal, it indicates acceptance on the display panel 48. The subscriber then awaits the next question or powers off his hand held terminal in the event of the quiz or series of questions having ended.

While the hand held terminal is connected to the host computer, the telephone 38 cannot be used. In general, a normal successful code verification, answer entry and answer verification session as outlined above will not exceed thirty seconds. The unique code or signature associated with each hand held terminal 34 may either be automatically transmitted to the host computer on powering up of the hand held terminal, or may be manually entered, as is described previously in the specification. In order to prevent outside interference or interpretation, encoding of the data may be necessary, in which case an encoding device would be located within each hand held terminal, and a corresponding decoding array would be located at the host computer.

While the telephone 38 is being used, or even if the telephone hand set is unhooked, the hand held terminal is automatically disabled. The routing of voice signals to the public switched telephone network 18 is transparent via the VDS switch 36 and the VDS multiplexer unit 14.1 to the PSTN 18. The voice connection takes priority, and cannot be interrupted by operation of the hand held terminal. The switch control unit 40 causes the switch 42 to default to the position indicated in solid outline in which the telephone is connected via the voice line to the PSTN 18.

The data communications system has a vast number of applications. Television quiz programmes can be arranged to allow for direct viewer participation. For instance, a series of ten multiple choice questions may be asked. Any viewer having a hand held terminal 34 may participate. Answers to the various questions are entered and verified on the hand held terminal 34. Entries will close a certain time period after the questions have been displayed on the screen. The host computer "marks" the answers from the subscribers by comparing the string of data input signals from each subscriber with the correct answers. Further information associated with each participating subscriber, such as the subscriber names and addresses, accumulated scores, billing information and black lists, may be located in a data bank at the host computer.

The communications link between the broadcasting station and the control station will enable the broadcast station 24 to update the control station 28, and vice versa.

In further embodiments of the invention, the hand held terminal may be cordless, and may have a range of up to 100 m. Furthermore, it is foreseen that the host computer would have ability to disable access of selected "black listed" subscribers at the VDS multiplexer level 14.1. If the subscriber forgets to terminate his data link by powering off the hand held terminal, a configurable idle timer at the host will automatically cause the hand held terminal to be disconnected after expiry of the permissible time period for answering.

One advantage of the data communications system of the invention is that it utilises existing telephone lines, as well as an existing backbone switching network. At the same time, it does not degrade the telephone network, as this network takes priority, and each local exchange is transparent to voice signals. As the data being transferred from each terminal is of an extremely low concentration, it can easily be concentrated both within each multiplexer card 15.1 to 15.X and within the local exchange 16 itself. This facilitates the high speed transmission of data to the control centre 28.

We claim:

1. An interactive multiple response evaluation system comprising:

a plurality of subscriber stations, each of which has a characteristic identification code associated therewith, an entry terminal for manually entering response data in response to a prompt transmitted on a broadcast signal from a broadcast station, a display means associate with said entry terminal, connection means for connecting the subscriber station to a respective one of a plurality of transmission lines, and switching means for selectively allowing data or voice signals on the transmission line via the entry terminal or via a telephone respectively;

a data switching mechanism associated with a local telephone exchange and interposed into the transmission lines between the subscriber stations and the local telephone exchange, said data switching mechanism comprising, a plurality of voice/data multiplexers each of which is linked to a respective data transmission line and includes at least one voice output line which in use is linked via the local telephone exchange to a public switched telephone network (PSTN), and at least one data output line;

a control device liked to each data output line from the plurality of voice/data multiplexers for controlling data conveyed along said data output lines;

a wide area network connected to the data output lines; and a host computer for processing data entered from the respective entry terminals, said host computer being linked to the data output lines through the wide area network, the host computer adapted to transmit confirmation signals via the wide area network, the data switching mechanism, and the transmission line to the respective subscriber station.

2. An interactive data communication system according to claim 1 wherein a plurality of data concentrators are provided from data output lines from a plurality of data switching mechanism.

3. An interactive data communication system according to claim 1 wherein the data switching mechanism is located in or in close proximity to a local telephone exchange.

4. A method of interactively transmitting and evaluating response data to a broadcast signal comprising the steps of:

a) establishing a network of subscriber stations, each subscriber station in the network comprising a terminal which is connected to a transmission line, the respective transmission lines being connected to a public switched telephone network (PSTN) via at least one local telephone exchange;

b) allocating a subscriber code to each subscriber station;

c) connecting a voice/data multiplexer into each transmission line between the subscriber station and the local telephone exchange, each said voice/data multiplexer having a voice output line and a data output line, said voice/data multiplexer adapted to route voice signals through the voice output line and data through the data output line;

d) connecting the data output lines through a control station to a host computer;

e) broadcasting a signal which can be responded to by subscribers at the respective subscriber station the data output lines from each respective voice/data multiplexer to the host computer;

g) registering in the host computer by monitoring the subscriber codes of the incoming response data which subscriber stations are actively responding to the broadcast signal; and h) processing the response data from each active subscriber station in the host computer.

5. A method according to claim 4 which includes the further step of transmitting a confirmation signal from the host computer to at least some of the active subscriber stations.

* * * * *